United States Patent [19]
Ovshinsky et al.

[11] Patent Number: 5,277,999
[45] Date of Patent: Jan. 11, 1994

[54] ELECTROCHEMICAL HYDROGEN STORAGE ALLOYS AND BATTERIES FABRICATED THESE ALLOYS HAVING SIGNIFICANTLY IMPROVED PERFORMANCE CHARACTERISTICS

[75] Inventors: Stanford R. Ovshinsky, Bloomfield Hills; Michael A. Fetcenko, Rochester Hills, both of Mich.

[73] Assignee: Ovonic Battery Company, Inc., Troy, Mich.

[21] Appl. No.: 934,976

[22] Filed: Aug. 25, 1992

Related U.S. Application Data

[63] Continuation-in-part of Ser. No. 746,015, Aug. 14, 1991, Pat. No. 5,238,756.

[51] Int. Cl.$^5$ ............................................. H01M 4/38
[52] U.S. Cl. ................................. 429/59; 429/101; 420/584.1; 420/586; 420/586.1; 420/900
[58] Field of Search ........................... 429/57, 59, 101; 420/584.1, 586, 586.1, 900

[56] References Cited

U.S. PATENT DOCUMENTS

| | | | |
|---|---|---|---|
| 4,551,400 | 11/1985 | Sapru et al. | 429/209 X |
| 4,728,586 | 3/1988 | Venkatesan et al. | 429/101 X |
| 4,849,205 | 7/1989 | Hong | 429/209 X |
| 5,096,667 | 3/1992 | Fetcenko | 429/101 X |

*Primary Examiner*—Stephen Kalafut
*Attorney, Agent, or Firm*—Marc J. Luddy; Marvin S. Siskind; David Schumaker

[57] ABSTRACT

A disordered electrochemical hydrogen storage alloy and electrochemical cells having a negative electrode comprising this alloy, where the alloy has the composition $$(\text{Base Alloy})_a\text{Co}_b\text{Mn}_c\text{Al}_d\text{Fe}_e\text{La}_f\text{Mo}_g$$

where Base Alloy represents a disordered multicomponent alloy having at least one structure selected from the group consisting of: amorphous; microcrystalline; polycrystalline, lacking long-range compositional order with three or more phases of said polycrystalline structure; and any combination of these structures; b is 0 to 7.5 atomic percent; c is 0.1 to 8.5 atomic percent; d is 0 to 2.5 atomic percent; e is 0.1 to 6.5 atomic percent; f is 0 to 4.5 atomic percent; g is 0 to 6.5 atomic percent; $b+c+d+e+f+g>0$; and $a+b+c+d+e+f+g=100$ atomic percent.

13 Claims, 2 Drawing Sheets

ELECTROCHEMICAL HYDROGEN STORAGE ALLOYS AND BATTERIES FABRICATED THESE ALLOYS HAVING SIGNIFICANTLY IMPROVED PERFORMANCE CHARACTERISTICS

The present invention is a continuation in part of U.S. application Ser. No. 07/746,015 filed Aug. 14, 1991, now U.S. Pat. No. 5,238,756.

FIELD OF THE INVENTION

The present invention relates to electrochemical hydrogen storage alloys and rechargeable electrochemical cells using these alloys.

More particularly, the invention relates to rechargeable cells and batteries having negative electrodes formed of multicomponent, electrochemical hydrogen storage alloys. Cells that incorporate these alloys have performance characteristics, such as energy density, charge retention, cycle life, and low temperature performance that are significantly improved over known rechargeable cells using hydrogen storage alloys.

BACKGROUND OF THE INVENTION

Rechargeable cells that use a nickel hydroxide positive electrode and a metal hydride forming hydrogen storage negative electrode ("metal hydride cells") are known in art.

When an electrical potential is applied between the electrolyte and a metal hydride electrode in a metal hydride cell, the negative electrode material (M) is charged by the electrochemical absorption of hydrogen and the electrochemical evolution of a hydroxyl ion; upon discharge, the stored hydrogen is released to form a water molecule and evolve an electron:

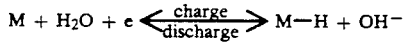

The reactions that take place at the positive electrode of a nickel metal hydride cell are also reversible. Most metal hydride cells use a nickel hydroxide positive electrode. The following charge and discharge reactions take place at a nickel hydroxide positive electrode:

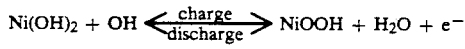

In a metal hydride cell having a nickel hydroxide positive electrode and a hydrogen storage negative electrode, the electrodes are typically separated by a non-woven, felled, nylon or polypropylene separator. The electrolyte is usually an alkaline aqueous electrolyte, for example, 20 to 45 weight percent potassium hydroxide.

The first hydrogen storage alloys to be investigated as battery electrode materials were TiNi and LaNi$_5$. Many years were spent in studying these simple binary intermetallics because they were known to have the proper hydrogen bond strength for use in electrochemical applications. Despite extensive efforts, however, researchers found these intermetallics to be extremely unstable and of marginal electrochemical value due to a variety of deleterious effects such as slow discharge, oxidation, corrosion, poor kinetics, and poor catalysis. These simple alloys for battery applications reflects the traditional bias of battery developers toward the use of single element couples of crystalline materials such as NiCd, NaS, LiMS, ZnBr, NiFe, NiZn, and Pb-acid. In order to improve the electrochemical properties of the binary intermetallics while maintaining the hydrogen storage efficiency, early workers began modifying TiNi and LaNi$_5$ systems.

The modification of TiNi and LaNi$_5$ was initiated by Stanford R. Ovshinsky at Energy Conversion Devices (ECD) of Troy, Mich. Ovshinsky and his team at ECD found that reliance on simple, relatively pure compounds was a major shortcoming of the prior art. Prior work had determined that catalytic action depends on surface reactions at sites of irregularities in the crystal structure. Relatively pure compounds were found to have a relatively low density of hydrogen storage sites, and the type of sites available occurred accidentally and were not designed into the bulk of the material. Thus, the efficiency of the storage of hydrogen and the subsequent release of hydrogen to form water was determined to be substantially less than that which would be possible if a greater number and variety of active sites were available.

Ovshinsky had previously found that the number of surface sites could be increased significantly by making an amorphous film that resembled the surface of the desired relatively pure materials. As Ovshinsky explained in *Principles and Applications of Amorphicity, Structural Change, and Optical Information Encoding*, 42 *Journal De Physique* at C4-1096 (October 1981):

> Amorphicity is a generic term referring to lack of X-ray diffraction evidence of long-range periodicity and is not a sufficient description of a material. To understand amorphous materials, there are several important factors to be considered: the type of chemical bonding, the number of bonds generated by the local order, that is its coordination, and the influence of the entire local environment, both chemical and geometrical, upon the resulting varied configurations. Amorphicity is not determined by random packing of atoms viewed as hard spheres nor is the amorphous solid merely a host with atoms imbedded at random. Amorphous materials should be viewed as being composed of an interactive matrix whose electronic configurations are generated by free energy forces and they can be specifically defined by the chemical nature and coordination of the constituent atoms. Utilizing multi-orbital elements and various preparation techniques, one can outwit the normal relaxations that reflect equilibrium conditions and, due to the three-dimensional freedom of the amorphous state, make entirely new types of amorphous materials—chemically modified materials . . .

Once amorphicity was understood as a means of introducing surface sites in a film, it was possible to produce "disorder" not only in amorphous materials, but also in crystalline materials; "disorder" that takes into account the entire spectrum of local order effects such as porosity, topology, crystallites, characteristics of sites, and distances between sites. Thus, rather than searching for material modifications that would yield ordered materials having a maximum number of accidentally occurring surface irregularities, Ovshinky's team at ECD began constructing "disordered" materials where the desired irregularities could be tailor made.

See, U.S. Pat. No. 4,623,597, the disclosure of which is incorporated by reference.

The term "disordered," as used herein corresponds to the meaning of the term as used in the literature, such as the following:

> A disordered semiconductor can exist in several structural states. This structural factor constitutes a new variable with which the physical properties of the [material] . . . can be controlled. Furthermore, structural disorder opens up the possibility to prepare in a metastable state new compositions and mixtures that far exceed the limits of thermodynamic equilibrium. Hence, we note the following as a further distinguishing feature. In many disordered [materials] . . . it is possible to control the short-range order parameter and thereby achieve drastic changes in the physical properties of these materials, including forcing new coordination numbers for elements . . . .

S. R. Ovshinsky, *The Shape of Disorder*, 32 Journal of Non-Crystalline Solids at 22 (1979) (emphasis added).

The "short-range order" of these disordered materials are further explained by Ovshinsky in *The Chemical Basis of Amorphicity: Structure and Function*, 26:8-9 Rev. Roum. Phys. at 893-903 (1981):

> [S]hort-range order is not conserved . . . . Indeed, when crystalline symmetry is destroyed, it becomes impossible to retain the same short-range order. The reason for this is that the short-range order is controlled by the force fields of the electron orbitals therefore the environment must be fundamentally different in corresponding crystalline and amorphous solids. In other words, it is the interaction of the local chemical bonds with their surrounding environment which determines the electrical, chemical, and physical properties of the material, and these can never be the same in amorphous materials as they are in crystalline materials . . . The orbital relationships that can exist in three-dimensional space in amorphous but not crystalline materials are the basis for new geometries, many of which are inherently anti-crystalline in nature. Distortion of bonds and displacement of atoms can be an adequate reason to cause amorphicity in single component materials. But to sufficiently understand the amorphicity, one must understand the three-dimensional relationships inherent in the amorphous state, for it is they which generate internal topology incompatible with the translational symmetry of the crystalline lattice . . . . What is important in the amorphous state is the fact that one can make an infinity of materials that do not have any crystalline counterparts, and that even the ones that do are similar primarily in chemical composition. The spatial and energetic relationships of these atoms can be entirely different in the amorphous and crystalline forms, even though their chemical elements can be the same . . .

Short-range, or local, order is elaborated on in U.S. Pat. No. 4,520,039 to Ovshinsky, entitled *Compositionally Varied Materials and Method for Synthesizing the Materials*, the contents of which are incorporated by reference. This patent discusses how disordered materials do not require any periodic local order and how, by using Ovshinsky's techniques, spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment plays a significant role physically, electrically, or chemically so as to affect the physical properties and hence the functions of the materials. These techniques result in means of synthesizing new materials which are disordered in several different senses simultaneously.

By forming metal hydride alloys from such disordered materials, Ovshinsky and his team were able to greatly increase the reversible hydrogen storage characteristics required for efficient and economical battery applications, and produce batteries having high density energy storage, efficient reversibility, high electrical efficiency, bulk hydrogen storage without structural change or poisoning, long cycle life, and deep discharge capability.

The improved characteristics of these alloys result from tailoring the local chemical order and hence the local structural order by the incorporation of selected modifier elements into a host matrix. Disordered metal hydride alloys have a substantially increased density of catalytically active sites and storage sites compared to simple, ordered crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Based on the pioneering principles described above, some of the most efficient electrochemical hydrogen storage materials were formulated. These are the Ti-V-Zr-Ni type active materials such as disclosed in U.S. Pat. No. 4,551,400 ("the '400 Patent") to Sapru, Hong, Fetcenko, and Venkatesan, the disclosure of which are incorporated by reference. These materials reversibly form hydrides in order to store hydrogen. All the materials used in the '400 Patent utilize a generic Ti-V-Ni composition, where at least Ti, V, and Ni are present with at least one or more of Cr, Zr, and Al. The materials of the '400 Patent are multiphase materials, which may contain, but are not limited to, one or more $AB_2$ phases with $C_{14}$ and $C_{15}$ type crystal structures. The following formulae are specifically disclosed in the '400 Patent:

$$(TiV_{2-x}Ni_x)_{1-y}M_y$$

where x is between 0.2 and 1.0; y is between 0.0 and 0.2; and M=Al or Zr;

$$Ti_{2-x}Zr_xV_{4-y}Ni_y$$

where Zr is partially substituted for Ti; x is between 0.0 and 1.5; and y is between 0.6 and 3.5; and $$Ti_{1-x}Cr_xV_{2-y}Ni_y$$

where Cr is partially substituted for Ti; x is between 0.0 and 0.75; and y is between 0.2 and 1.0.

Other Ti-V-Zr-Ni alloys may also be used for a rechargeable hydrogen storage negative electrode. One such family of materials are those described in U.S. Pat. No. 4,728,586 ("the '586 Patent") to Venkatesan, Reichman, and Fetcenko for *Enhanced Charge Retention Electrochemical Hydrogen Storage Alloys and an Enhanced Charge Retention Electrochemical Cell*, the disclosure of which is incorporated by reference. The '586 Patent describes a specific sub-class of these Ti-V-Ni-Zr alloys comprising Ti, V, Zr, Ni, and a fifth component, Cr.

In a particularly preferred exemplification of the '586 Patent, the alloy has the composition

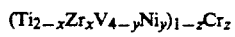

$(Ti_{2-x}Zr_xV_{4-y}Ni_y)_{1-z}Cr_z$ where x is from 0.00 to 1.5, y is from 0.6 to 3.5, and z is an effective amount less than 0.20. These alloys may be viewed stoichiometrically as comprising 80 atomic percent of a V-Ti-Zr-Ni moiety and up to 20 atomic percent Cr, where the ratio of (Ti+Zr+Cr+optional modifiers) to (Ni+V+optional modifiers) is between 0.40 to 0.67. The '586 patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

The V-Ti-Zr-Ni family of alloys described in the '586 Patent has an inherently higher discharge rate capability than previously described alloys. This is the result of substantially higher surface areas at the metal/electrolyte interface for electrodes made from the V-Ti-Zr-Ni materials. The surface roughness factor (total surface area divided by geometric surface area) of V-Ti-Zr-Ni alloys is about 10,000. This value indicates a very high surface area and is supported by the inherently high rate capability of these materials. The characteristic surface roughness of the metal/electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys, in an alkaline environment. These microscopic chemical, physical, and crystallographic parameters of the individual phases within the hydrogen storage alloy material are believed to be important in determining its macroscopic electrochemical characteristics.

In addition to the physical nature of its roughened surface, it has been observed that V-Ti-Zr-Ni alloys tends to reach a steady state surface composition and particle size. This steady state surface composition is characterized by a relatively high concentration of metallic nickel. These observations are consistent with a relatively high rate of removal through precipitation of the oxides of titanium and zirconium from the surface and a much lower rate of nickel solubilization, providing a degree of porosity to the surface. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

The surface of the negative electrode, which has a conductive and catalytic components, such as the metallic nickel, catalyzes various charge and discharge reaction steps.

In contrast to the Ti-V-Zr-Ni based alloys described above, alloys of the AB$_5$ type have generally been considered "ordered" materials that have a different chemistry and microstructure, and exhibit different electrochemical characteristics compared to the Ti-V-Zr-Ni alloys. However, analysis reveals while the early AB$_5$ alloys may have been ordered materials, more recently developed AB$_5$ alloys are not. The performance of the early ordered AB$_5$ materials was poor. However, presently used AB$_5$ alloys have a high degree of modification (that is as the number and amount of elemental modifiers increased) and the performance of the AB$_5$ alloys has improved significantly. This is due to the disorder contributed by the modifiers as well as their electrical and chemical properties. This evolution of AB$_5$ type alloys from a specific class of "ordered" materials to the current multicomponent, multiphase "disordered" alloys that are now very similar to Ti-V-Zr-Ni alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No. 4,112,199; (vi) U.S. Pat. No. 4,125,688; (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference.)

Simply stated, in the AB$_5$ alloys, like the Ti-V-Zr-Ni alloys, as the degree of modification increases, the role of the initially ordered base alloy becomes of secondary importance compared to the properties and disorder attributable to the particular modifiers. In addition, analysis of the current multiple component AB$_5$ alloys indicates that current AB$_5$ alloy systems are modified following the guidelines established for AB$_2$ systems. Thus, highly modified AB$_5$ alloys are identical to AB$_2$ alloys in that both are disordered materials that are characterized by multiple-components and multiple phases are there no longer exists any significant distinction between these two types of multicomponent, multiphase alloys.

DEFICIENCIES OF THE PRIOR ART

While prior art hydrogen storage alloys frequently incorporate various individual modifiers and combinations of modifiers to enhance their performance characteristics, there is no clear teaching of the role of any individual modifier, the interaction of any modifier with other components of the alloy, or the effects of any modifier on specific operational parameters. Because highly modified AB$_5$ alloys were being analyzed from within the context of well ordered crystalline materials, the effect of these modifiers, in particular, was not clearly understood.

Prior art hydrogen storage alloys have generally been able to provide improved performance attributes, such as cycle life, rate of discharge voltage, polarization, self discharge, low temperature capacity, and low temperature voltage. However, prior art alloys have yielded cells that exhibit a quantitative improvement in one or two performance characteristic at the expense of a quantitative reduction in other performance characteristics. Often, the outstanding performance characteristics of these cells are sometimes only slightly better than comparable characteristics of other kinds of cells such as NiCds. Thus, all of the cells produced from prior art alloys were special purpose cells whose performance characteristics, both good and bad represented an engineering compromise and, therefore, were closely tailored to the intended use of the cell.

SUMMARY OF THE INVENTION

One object of the present invention is hydrogen storage alloys that exhibit improved performance characteristics without a reduction in other performance characteristics.

Another object of the present invention is hydrogen storage alloys that exhibit significantly improved performance characteristics compared to other kinds of alloys.

These and other objects of the present invention are satisfied by hydrogen storage alloys having the composition

$$(\text{Base Alloy})_a Co_b Mn_c Al_d Fe_e La_f Mo_g$$

where Base Alloy represents a disordered multicomponent alloy having at least one structure selected from the group consisting of amorphous, microcrystalline, polycrystalline (lacking long-range compositional order with three or more phases of said polycrystalline structure), and any combination of these structures; b is 0 to 7.5 atomic percent, preferably 4 to 7 atomic percent; c is 0.1 to 8.5 atomic percent, preferably 6 to 8 atomic percent; d is 0 to 2.5 atomic percent, preferably 0.1 to 2 atomic percent; e is 0.1 to 6 atomic percent, preferably 1 to 3 atomic percent or 5.3 to 6 atomic percent; f is 0 to 4.5 atomic percent, preferably 1 to 4 atomic percent; g is 0 to 6.5 atomic percent, preferably 0.1 to 6 atomic percent, most preferably about 6 atomic percent; $b+c+d+e+f+g>0$; and $a+b+c+d+e+f+g=100$ atomic percent.

Still other objects of the present invention are satisfied by a metal hydride cell comprising a negative electrode composed of the alloys described above.

DETAILED DESCRIPTION OF THE INVENTION

Figure 1:
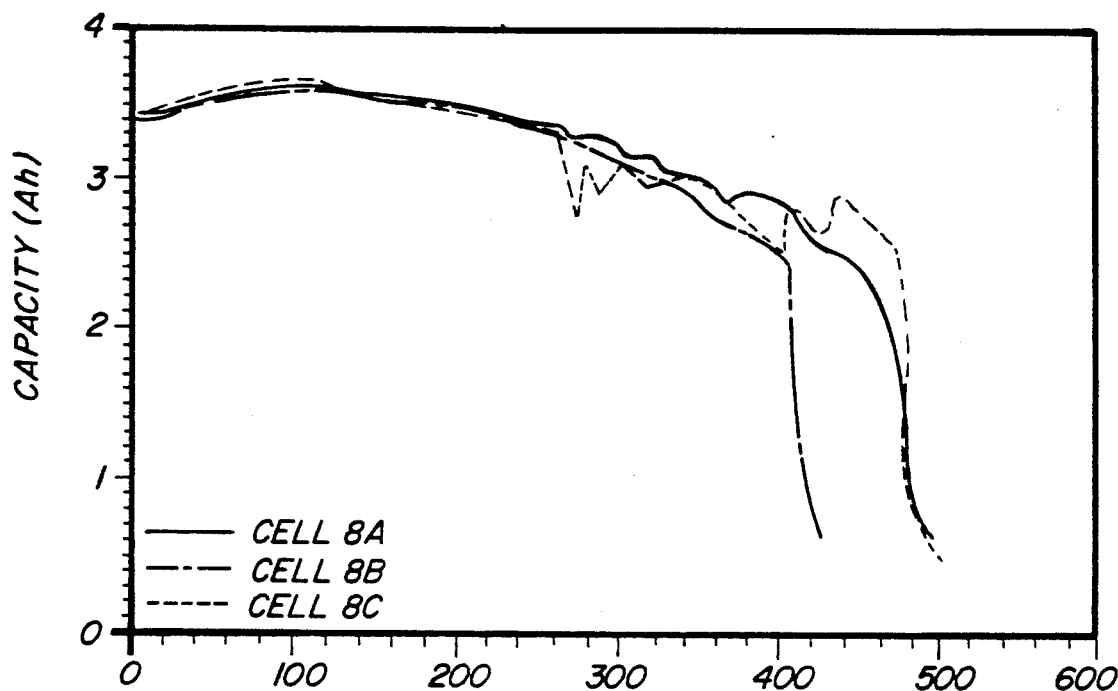
FIGS. 1-4 show capacity v. cycle life, pressure v. cycles, and pressure v. overcharge current for different embodiments of the present invention.

Disordered metal hydride alloy materials of the present invention are designed to have unusual two and three dimensional electronic configurations by varying the three dimensional interactions of constituent atoms and their various orbitals. The disorder in these alloys comes from compositonal, positional, and translational relationships as well as disorder provided by the number, position, and size of crystallites of atoms that are not limited by conventional crystalline symmetry in their freedom to interact. This disorder can be of an atomic nature in the form of compositional or configurational disorder provided throughout the bulk or in numerous regions of the material. These disordered alloys have less order than the highly ordered crystalline structures which provide the single phase materials such as used for many of the electrode alloys of the prior art. The types of disordered structures which provide the local structural chemical environments for improved hydrogen storage characteristics in accordance with the present invention are multicomponent polycrystalline materials lacking long range compositional order; microcrystalline materials; amorphous materials having one or more phases; multiphase materials containing both amorphous and crystalline phases; or mixtures thereof.

The framework for disordered metal hydride alloys is a host matrix of one or more elements. The host elements are chosen in general to be hydride formers and can be lightweight elements. Exemplary host matrix elements can be LaNi or TiNi. The host matrix elements are modified by incorporating selected modifier elements, which may or may not be hydride formers.

We have found through extensive analysis that regardless of the initial host matrix materials, when numerous modifier elements are introduced, such as those described in the present invention, that a disordered material results that has superior electrochemical properties due to an increase in the number and spectrum of catalytically active, hydrogen storage sites. In particular, multi-orbital modifiers, for example transition elements, provide a greatly increased number of storage sites due to the various bonding configurations available thus resulting in an increase in energy density. Modification that results in a non-equilibrium material having a high degree of disorder provides unique bonding configurations, orbital overlap and hence a spectrum of bonding sites. Due to the different degrees of orbital overlap and the disordered structure, an insignificant amount of structural rearrangement occurs during charge/discharge cycles, or during rest periods, resulting in long cycle and shelf life.

The hydrogen storage and other electrochemical characteristics of disordered electrode materials can be controllably altered depending on the type and quantity of host matrix material and modifier elements selected for making the negative electrode materials. The negative electrode alloys of the present invention are resistant to degradation by poisoning due to the increased number of selectively designed storage and catalytically active sites which also contribute to long cycle life. Also, some of the sites designed into the material can bond with and resist poisoning without effecting the active hydrogen sites. The materials thus formed have a very low self discharge and hence good shelf life.

As used herein, the term "Base Alloy" refers to a disordered alloy having a base alloy (as this term is described in the '400 patent) that is a disordered multicomponent alloy having at least one structure selected from the group consisting of amorphous, microcrystalline, polycrystalline (lacking long-range compositional order with three or more phases of said polycrystalline structure), and any combination of these structures. The terms "amorphous," "microcrystalline," and "polycrystalline" are used as defined in U.S. Pat. No. 4,623,597 to Sapru, et al., the contents of which are incorporated by reference. The alloys of the present invention are not limited to any particular structure. These materials are classified as having a disordered structure and encompass materials that have commonly been referred to by a variety of other terms such as AB, $AB_2$, $AB_5$, $LaNi_5$, mischmetal, $C_{14}$, $C_{15}$, Laves phase, etc. The most preferred formulation of this Base Alloy contains 0.1 to 60 atomic percent Ti, 0.1 to 25 atomic percent Zr, 0.1 to 60 atomic percent V, 0.1 to 57 atomic percent Ni, and 0.1 to 56 atomic percent Cr.

The alloys of the present invention comprise negative electrodes for metal hydride cells that exhibit extremely high storage capacity and other significant quantitative improvements in their performance characteristics compared to prior art cells. Surprisingly, embodiments of the present invention show improvement in most, if not all, of their performance characteristics, and thus can be considered universal application cells.

In accordance with the present invention, it has been found that the alloys of the present invention described above and in the Summary of the Invention can be further classified as having a disordered microstructure where hydrogen in a particular phase is not easily discharged either through low surface area, or through an oxide of limited porosity or catalytic property. Examples of the present invention are set forth in Table 1, below.

TABLE 1

| | |
|---|---|
| 1. | $V_{18}Ti_{15}Zr_{18}Ni_{29}Cr_5Co_7Mn_8$ |
| 2. | $V_{15}Ti_{15}Zr_{21}Ni_{31}Co_6Fe_6Mn_6$ |
| 3. | $V_{15}Ti_{15}Zr_{20}Ni_{28}Cr_{5.3}Co_{5.3}Fe_{5.3}Mn_6$ |
| 4. | $V_{16}Ti_{15}Zr_{20}Ni_{31}Cr_6Fe_6Mn_6$ |
| 5. | $V_{15}Ti_{15}Zr_{19}Ni_{28}Cr_4Co_4Fe_2Mn_7Al_2La_4$ |
| 6. | $V_{16}Ti_{16}Zr_{20}Ni_{28}Cr_4Co_4Fe_2Mn_7Al_2La_1$ |
| 7. | $V_{18}Ti_{15}Zr_{18}Ni_{29}Cr_5Co_6Fe_1Mn_8$ |
| 8. | $V_{18}Ti_{15}Zr_{18}Ni_{29}Cr_4Co_6Fe_2Mn_8$ |
| 9. | $V_{15}Ti_{15}Zr_{21}Ni_{29}Cr_5Co_7Mn_8$ |
| 10. | $V_{15}Ti_{15}Zr_{21}Ni_{29}Cr_5Co_6Fe_1Mn_8$ |
| 11. | $V_{15}Ti_{15}Zr_{21}Ni_{29}Cr_4Co_6Fe_2Mn_8$ |
| 12. | $V_{18}Ti_{15}Zr_{18}Ni_{28}Cr_2Co_5Mn_8Mo_6$ |

The affects of the addition of Mn can be seen in negative electrode materials of the present invention having the composition of formula (1)

$$(\text{Base Alloy})_a Co_b Mn_c Fe_d \tag{1}$$

where b is 0.1 to 7.5 atomic percent, preferably 5 to 7.0 atomic percent; c is 0.1 to 8.5 atomic percent, preferably 6.0 to 8.0 atomic percent; d is 0.1 to 6.5, preferably 5.3 to 6 atomic percent; and a+b+c+d=100 atomic percent. Alloy #3 is an embodiment of these materials.

Comparing materials of formula (1) with previously described materials demonstrates that the use of 6 to 8 atomic percent Mn results in increased storage capacity and low temperature capability as well as low cell pressure and high cycle life. For example, alloy #3 has storage capacity of 396 mAh/g compared to alloy #C6, an embodiment of prior art materials, which has an energy density of only 315 Ah/g.

Though not wishing to be bound by theory, it is believed that in the alloys of the present invention, Mn alters the microstructure in such a way that the precipitation of phases having hydrogen bond strengths is outside of the range of electrochemical usefulness is inhibited. One way in which Mn appears to accomplishes this is by increasing the mutual solubility of the other elements within the primary phases during solidification. In addition, Mn functions at the electrochemically active surface oxide as a catalyst. The multiple oxidation states of Mn are believed to catalyze the electrochemical discharge reaction by increasing the porosity, conductivity, and surface area of the active surface oxide film.

Still another role of Mn is observed in negative electrode materials having composition (2):

$$(\text{Base Alloy})_a Co_b Mn_c \tag{2}$$

where b is 4 to 7.5 atomic percent, preferably 6.5 to 7.5 atomic percent; c is 5.5 to 8.5 atomic percent, preferably 7.5 to 8.5 atomic percent; and a+b+c=100 atomic percent. Alloys #1 and #9 are embodiments of these materials.

In the alloys of formula (2), the addition of Mn yields enhanced low temperature performance as well as increased hydrogen storage capacity. For example, this can be observed by comparing alloy #1, which has an energy density of 376 mAh/g or alloy #9 which has an energy density of 395 mAh/g with alloy #C7 which has an energy density of 315 mAh/g.

In addition, Mn has been added as a replacement for Fe in the alloys of formula (2). Though not wishing to be bound by theory, it is believed that when Mn is present without Fe, Mn assists the electrochemical discharge reaction at low temperature by promoting bulk diffusion of hydrogen at low temperature and also by catalyzing the reaction of hydrogen and hydroxyl ions at the alloy surface. Because of the low temperature properties of the formula (2) alloys, it appears that Mn's catalytic properties are emphasized when Fe is not present, or at least present in only low concentrations.

Other effects of the materials of the present invention are satisfied by an electrochemical cell comprising a negative electrode having the composition $$(\text{Base Alloy})_a Mn_b Fe_c \tag{3}$$

where b is 5.5 to 6.5 atomic percent; c is 5.5 to 6.5 atomic percent, preferably about 6 atomic percent; and a+b+c=100 atomic percent. Alloy #4 is an embodiment of these materials.

In the materials of formula (3), Mn has been substituted for Co. In the materials of formula (3), one can observe that hydrogen storage capacity increases while maintaining excellent charge retention. This can be seen below by comparing alloy #4 which has an energy density of 400 mAh/g with alloy #C6, which has an energy density of only 315 mAh/g.

Though not wishing to be bound by theory, it is believed that in the alloys of formula (3), like the alloys of formula (1) described above, Mn alters the microstructure and acts as a catalyst at the electrochemically active surface oxide.

Another aspect of the present invention includes cells having negative electrodes formed from alloys having a composition according to formula (4):

$$(\text{Base Alloy})_a Co_b Mn_c Al_d Fe_e La_f \tag{4}$$

where b is 0.1 to 7.5 atomic percent, preferably 5 to 7 atomic percent; c is 0.1 to 8.5 atomic percent, preferably 7 to 8 atomic percent; d is 0.1 to 2.5 atomic percent, preferably about 1.5 to 2.5 atomic percent; e is 0.1 to 3 atomic percent, preferably 1 to 2 atomic percent; f is 0.1 to 4.5 atomic percent, preferably 1 to 4 atomic percent; and a+b+c+d+e+f=100 atomic percent. Alloys #5 and #6 are embodiments of these materials.

In the materials formula (4) compositions a small addition of La can be useful in increasing hydrogen storage capacity as well as low temperature capacity. This can be seen by comparing alloy #5 with alloy #C8. See, Table 5, below.

In particular, we note that the purity of the La used is not critical to the present invention, and various forms of mischmetal appear to be as effective as high purity La. Thus, as used herein, La includes high purity La and/or mischmetal, where the mischmetal rare earth component may consist of any of the numerous commercially available materials some of which may contain La in high or low amounts, or even none.

Though not wishing to be bound by theory, it is believed that the addition of La has several functions:

(1) La functions as a hydride. While La in the form of LaNi$_5$ absorbs considerable quantities of hydrogen, La in LaNi$_5$ is easily oxidized and corroded in alkaline medium. However, this corrosion is not observed in the disordered alloys of the present invention. It is believed that the disordered compositions of the present invention that include La, such as those described by the above general formula "protect" the La from corrosion without interfering with La absorption of hydrogen.

(2) La acts to remove impurities during the melting process. During high temperature melting, it is believed that the La absorbs impurities such as oxygen because it has a high free energy for formation of oxides. It is believed that oxygen is effectively removed from interstitial sites in the standard alloy to reside in the La rich impurity phases, thus providing increased storage sites in the basic alloy.

(3) La in higher concentrations appears to assists low temperature discharge in the same manner as it removes oxygen. It appears that light element impurities play a key role in inhibiting first hydrogen diffusion during low temperature discharge. The elimination of these impurities by the use of La or any other "impurity getter," would thus be the key factor in promoting good low temperature discharge.

Quite unexpectedly, some preferred embodiments of the present invention, that contain 0.1 to 3 atomic percent, preferably 1 to 2 atomic percent Fe and 6.5 to 8.5 atomic percent, preferably 7 to 8 atomic percent Mn, exhibit significantly improved charge retention compared to the prior art. In addition, these Ovonic Base Alloys also exhibit excellent low temperature performance as well as a significant improvement in cycle life and other performance characteristics. Particularly preferred embodiments of these alloys are described by formula (5):

$$(\text{Base Alloy})_a\text{Co}_b\text{Mn}_c\text{Fe}_d \qquad (5)$$

where b is 4.5 to 7.5 atomic percent, preferably 5 to 7 atomic percent; c is 6.5 to 8.5 atomic percent, preferably 7 to 8 atomic percent; d is 0.1 to 3 atomic percent, preferably 1 to 2 atomic percent; and $a+b+c+d=100$. Alloys #7, #8, #10, and #11 are embodiments of these materials.

Materials described by formula (5) have a very low pressure during operation and exhibit long cycle life, high rate discharge, substantially increased hydrogen storage capacity, improved charge retention, and improved low temperature discharge capability. This can be seen by comparing alloys #7, #8, #10, and #11, with the prior art alloys such as alloys #C5 and #C6 (see, Tables 2 to 5, below).

The improved performance of these compositions has been accomplished by the unexpected discovery that the beneficial effects of Mn additive to the inventive compositions in the characteristics of low temperature performance can be inhibited by an unoptimized quantity of Fe. In particular, we have discovered that Fe in the quantities of about 0.1 to 3 atomic percent and more particularly 1 to 2 atomic percent improved low temperature capability compared to similar alloys having Fe at a level of about 6 atomic percent. We have discovered that the lower quantity of Fe still provides the beneficial effect of improved cycle life. See, Table 5, below.

The beneficial effects of Mn and Fe have also been detailed in U.S. Pat. Nos. 5,096,667, 5,104,617, and U.S. patent application Ser. No. 07/746,015 (pending) the contents of which are incorporated by reference.

It is noted in U.S. Pat. No. 5,104,617 that it was widely believed that the inclusion of Fe in metal hydride hydrogen storage alloy materials would deleteriously effect electrochemical performance. This belief was due to the knowledge that Fe readily oxidizes and corrodes, particularly in the presence of an alkaline electrolyte. Oxidation reduces the performance of a metal hydride electrode in many ways, and oxides of Fe were known in the prior art to adversely affect the nickel hydroxide positive electrode, particularly with respect to charging efficiency and thus capacity and cycle life.

Still other embodiments of the present invention contain negative electrodes comprising alloys of material (6)

$$(\text{Base Alloy})_a\text{Co}_b\text{Mn}_c\text{Mo}_d \qquad (6)$$

where b is 0.1 to 5.5 atomic percent, preferably 4.5 to 5.5 atomic percent; c is 0.1 to 8.5 atomic percent, preferably 7.5 to 8.5 atomic percent; d is 0.1 to 6.5 atomic percent, preferably 5.5 to 6.5 atomic percent; and $a+b+c+d=100$. Alloy #12 is an embodiment of these materials.

All of the alloys of the present invention involve Mn. The effects of the addition of Mn to these alloys is generally discussed in U.S. Pat. No. 5,096,667, the contents of which are incorporated by reference. The addition of Mn usually results in improved charging efficiency. Though not wishing to be bound by theory, this effect appears to result from Mn's ability to improve the charging efficiency of alloys it is added to by improving the oxidation resistance and oxygen recombination. It has been observed that oxygen gas generated at the nickel hydroxide positive electrode recombined at the surface of the metal hydride electrode. Oxygen recombination is an especially aggressive oxidizer of its environment, even compared to the alkaline electrolyte.

It is possible that the modifier elements of the Base Alloy of the present invention, particularly Mn and Fe, and most particularly Co, either alone, or in combination with Mn and/or Al for example, act to catalyze oxygen reduction, thereby avoiding or reducing the oxidation of the surrounding elements in the metal hydride alloy. It is believed that this function of the modified alloys reduces or even eliminates the formation and build up of detrimental surface oxide, thereby providing a thinner and more stable surface.

In addition to these affects, and quite unexpectedly, we found that the combination of Mn and excess Fe retards the low temperature capability benefits of Mn even though room temperature discharge rate capability may be unaffected.

Though not wishing to be bound by theory, it is believed that several additional factors may explain the unexpected behavior of Mn and Fe in the Base Alloys of the present invention:

(1) The combination of Mn and excess Fe may affect the bulk alloy by inhibiting the bulk diffusion rate of hydrogen within the metal through the formation of complex phase structures, either by effecting the grain boundaries or by affecting the equilibrium bond strength of hydrogen within the metal. In other words, the temperature dependance of the hydrogen bond strength may be increased thereby decreasing the available voltage and capacity available under low temperature discharge.

(2) It is believed that the combination of Mn and excess Fe may result in a lower electrode surface area for metallurgical reasons by increasing the ductility of the alloy and thereby reducing the amount of surface area formation during the activation process.

(3) It is believed that the combination of Mn and excess Fe to these alloys may inhibit low temperature discharge through the alteration of the oxide layer itself with respect to conductivity, porosity, thickness, and/or catalytic activity. The oxide layer is an important factor in the discharge reaction and promotes the reaction of hydrogen from the Base Alloy of the present invention and hydroxyl ion from the electrolyte. We believe this reaction is promoted by a thin, conductive, porous oxide having some catalytic activity.

The combination of Mn and excess Fe does not appear to be a problem under room temperature discharge, but has shown a surprising tendency to retard the low temperature reaction. The formation of a complex oxide could result in a subtle change in oxide structure such as pore size distribution or porosity. Since the discharge reaction produces water at the metal hydride surface and within the oxide itself, a small pore size may be causing a slow diffusion of $K^+$ and $OH^-$ ions from the bulk of the electrolyte to the oxide. Under room temperature discharge where polarization is almost entirely ohmic to low temperature discharge where activation and concentration polarization components dominate the physical structure of the oxides with Fe and Mn compared to Mn alone could be substantially different.

Still another possible explanation is that the Mn and Fe have multivalent oxidation states. It is considered that some elements within the oxide may in fact change oxidation state during normal state of charge variance as a function of the rate of discharge and can be both temperature, fabrication, can compositionally dependant. It is possible these multiple oxidation states have different catalytic activity as well as different densities that together effect oxide porosity.

A possible problem with a complex oxide containing both Mn and excess Fe could be that the Fe component retards the ability of the Mn to change oxidation state if present in large quantities.

Throughout the preceding discussion with respect to the oxide it should be noted that the oxide also contains other components of the Base Alloy of the present invention, such as V, Ti, Zr, Ni, and/or Cr and other modifier elements. The discussion of a complex oxide of Mn and Fe is merely for the sake of brevity and one skilled in the art should not infer that the actual mechanism cannot also include a different or more complex explanation involving other such elements.

Negative electrodes using alloys of the present invention can be used in many types of hydrogen storage cells and batteries. These include flat cells having a substantially flat plate negative electrode, a separator, and a positive electrode or counter electrode that is substantially flat and aligned to be in operative contact with the negative electrode; jelly-roll cells made by spirally winding a flat cell about an axis; and prismatic cells for use in electric vehicles, for example. The metal hydride cells of the present invention can use any appropriate kind of container, and can be constructed, for example of metal or plastic.

A 30 weight percent aqueous solution of potassium hydroxide is a preferred electrolyte.

In a particularly preferred embodiment, alloys used in conjunction with advanced separator materials as disclosed in the copending U.S. patent application Ser. No. 07/879,823, titled *Metal Hydride Cells Having Improved Cycle Life and Charge Retention*, by Fetcenko, et al., yield improved performance over prior art alloys for certain electrochemical applications.

Besides the improved technical performance discussed above, alloy modification offers cost advantages of up to 30%. One of the dominant factors effecting base alloy cost is the cost of vanadium metal. In U.S. Pat. No. 5,002,730 incorporated by reference, vanadium in the form of V-Ni or V-Fe offers significant cost advantages over pure vanadium. Such cost improvements can be increased in the Base Alloys of the present invention through the use of V-Fe.

EXAMPLES

Preparation of Negative Electrode Materials

Alloy materials described in Table 1, above, and comparison materials described in Table 2 were prepared and fabricated as described below into negative electrode materials. The specific alloys used are referred to in the Tables of each specific Example. The numbering of the alloys is consistent throughout the application and refers to Table 1 to Table 2.

TABLE 2

| COMPARISON MATERIALS | |
| --- | --- |
| C1. | $V_{22}Ti_{16}Zr_{16}Ni_{32}Cr_7Co_7$ |
| C2. | $V_{20.6}Ti_{15}Zr_{15}Ni_{30}Cr_{6.6}Co_{6.6}Mn_{3.6}Al_{2.7}$ |
| C3. | $V_{22}Ti_{16}Zr_{16}Ni_{39}Fe_7$ |
| C4. | $V_{22}Ti_{16}Zr_{16}Ni_{34}Co_7Fe_6$ |
| C5. | $V_{21}Ti_{15}Zr_{15}Ni_{31}Cr_6Co_6Fe_6$ |
| C6. | $V_{15}Ti_{15}Zr_{21}Ni_{31}Cr_6Co_6Fe_6$ |
| C7. | $V_{18}Ti_{15}Zr_{18}Ni_{31}Cr_6Co_6Fe_6$ |
| C8. | $V_{22}Ti_{11}Zr_{21}Ni_{39}Fe_7$ |

The alloys of Tables 1 and 2 were prepared by weighing and mixing starting materials of the component elements into a graphite crucible as described in U.S. Pat. No. 5,002,730 to Fetcenko and U.S. Pat. No. 4,948,423 to Fetcenko, et al. The crucible and its contents were placed in a vacuum furnace which was evacuated and then pressurized with approximately one atmosphere of argon. The crucible contents were melted by high frequency induction heating while under the argon atmosphere. The melting was carried out at a temperature of about 1500° C. until a uniform melt was obtained. At that time, the heating was terminated and the melt was allowed to solidify under an inert atmosphere blanket.

The ingot of alloy material was then reduced in size in a multi-step process. The first step involved a hydriding/dehydriding process substantially as described in U.S. Pat. No. 4,983,756 to Fetcenko, et al., entitled *Hydride Reactor Apparatus for Hydrogen Comminution of Metal Hydride Hydrogen Storage Alloy Material*, the disclosure of which is specifically incorporated by reference. In this first step, the alloy was reduced in size to less than 100 mesh. Subsequently, the material obtained from the hydriding/dehydriding process was further reduced in size by an impact milling process in which the particles were tangentially and radially accelerated against an impact block. This process is described in U.S. Pat. No. 4,915,898 to Wolff, et al., entitled *Method for the Continuous Fabrication of Comminuted Hydrogen Storage Alloy Negative Electrode Material*, the disclosure of which is specifically incorporated by reference.

A fraction of the alloy material having a particle size of less than 200 mesh and a mass average particle size of about 400 mesh (38 microns) was recovered from the impact milling process and bonded to a nickel screen current collector by a process which involves disposing a layer of alloy material onto the current collector and compacting the powder and collector. Compacting was carried out under an inert atmosphere with two separate compaction steps, each at a pressure of about 16 tons per square inch. After compaction, the current collector and the powder adhered to it were sintered in an atmosphere of about 2 atomic percent hydrogen with the balance argon to form negative electrode materials.

These alloys and negative electrodes were activated using the alkaline etch treatment described in U.S. Pat. No. 4,716,088 to Reichmann, et al., the disclosure of which is specifically incorporated by reference. As a practical matter some oxidation occurs during electrode fabrication, and thus, exposing the alloy powder or negative electrodes of the present invention to an alkaline solution to "etch" or after the nature of the surface oxides that form yields a variety of beneficial results. For example, it is believed that etching alters the surface condition of the alloy powder or formed negative electrode material in such a way that improved charging efficiency is achieved on even the first charge cycle; promotes the ionic diffusion required for the electrochemical discharge process; creates an oxidation state gradient at the surface of the material; and alters the surface oxide to yield greater charge acceptance.

Preparation of Cells

Prepared negative electrodes were assembled with nickel hydroxide positive electrodes into sealed "C" cells having a resealable vent, as described in U.S. Pat. No. 4,822,377 to Wolff, using a 30% KOH electrolyte.

EXAMPLE 1

Finished cells prepared as described above using the alloys set forth in Table 3, below, were subjected to charging and discharging conditions and the Energy Density (mAh/g) determined.

The data obtained from these tests is set forth in Table 3, below.

TABLE 3

| ALLOY | Energy Density (mAh/g) |
|---|---|
| C1 | 320 |
| C2 | 315 |
| C3 | 300 |
| C4 | 300 |
| C5 | 290 |
| C6 | 315 |
| C7 | 315 |
| C8 | 300 |
| 1 | 376 |
| 3 | 396 |
| 4 | 400 |
| 5 | 371 |
| 6 | 420 |
| 7 | 385 |
| 8 | 370 |
| 9 | 394 |
| 10 | 378 |
| 11 | 382 |

EXAMPLE 2

Cells were prepared as described above using the alloys listed in Table 4, and the Charge Retention determined.

The data obtained from these tests is set forth in Table 4, below.

TABLE 4

| ALLOY | Charge Retention % 7 days | Charge Retention % 30 days |
|---|---|---|
| C1 | 75 | 50 |
| C2 | 75 | 50 |
| C5 | 75 | 50 |
| C7 | 70 | 40 |
| C8 | 72 | 45 |
| 2 | 80 | 55 |
| 3 | 85 | 65 |
| 7 | 83 | 50 |
| 8 | 82 | 49 |
| 9 | 87 | 65 |
| 10 | 85 | 63 |
| 11 | 86 | 60 |

EXAMPLE 3

Cells were prepared as described above using the alloys listed in Table 5. The finished cells were subjected to charging and discharging conditions at low temperatures and their capacity determined.

The data obtained from these tests is set forth in Table 5, below.

TABLE 5

| | LOW TEMPERATURE PERFORMANCE | |
|---|---|---|
| | Percentage of room temperature capacity (C/2 discharge) | |
| ALLOY | 0° C. | −10° C. |
| C6 | 5 | 0 |
| 3 | 51 | 3 |
| 4 | 24 | 5 |
| 5 | 65 | 17 |
| 6 | 95 | 17 |
| 7 | 100 | 24 |
| 8 | 64 | 9 |
| 9 | 57 | 9 |
| 10 | 75 | 8 |

EXAMPLE 4

Figure 2:
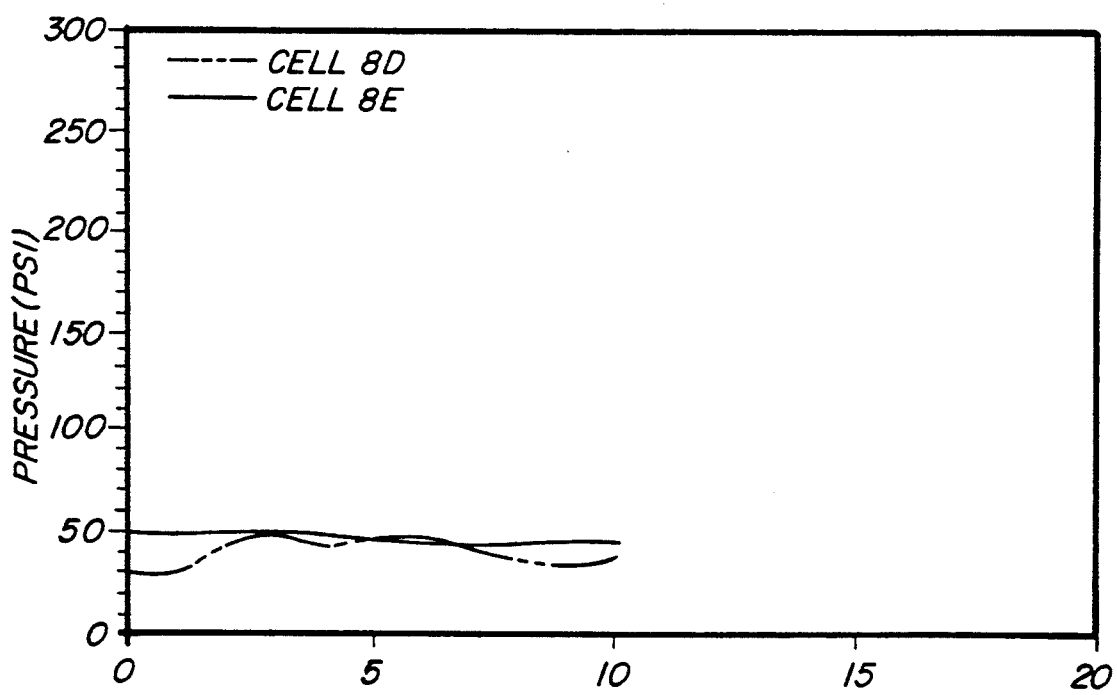

Cells 8A, 8B, 8C, 8D, and 8E were prepared as described above from alloy No. 8. These representative cells were subjected to charging and discharging conditions. The results of this analysis are presented in FIGS. 1 and 2. FIG. 1 shows peak capacities of about 3.7 Ah and cycle lives of 500 cycles. FIG. 2 shows pressure remained steady during cycling.

EXAMPLE 5

Figure 3:
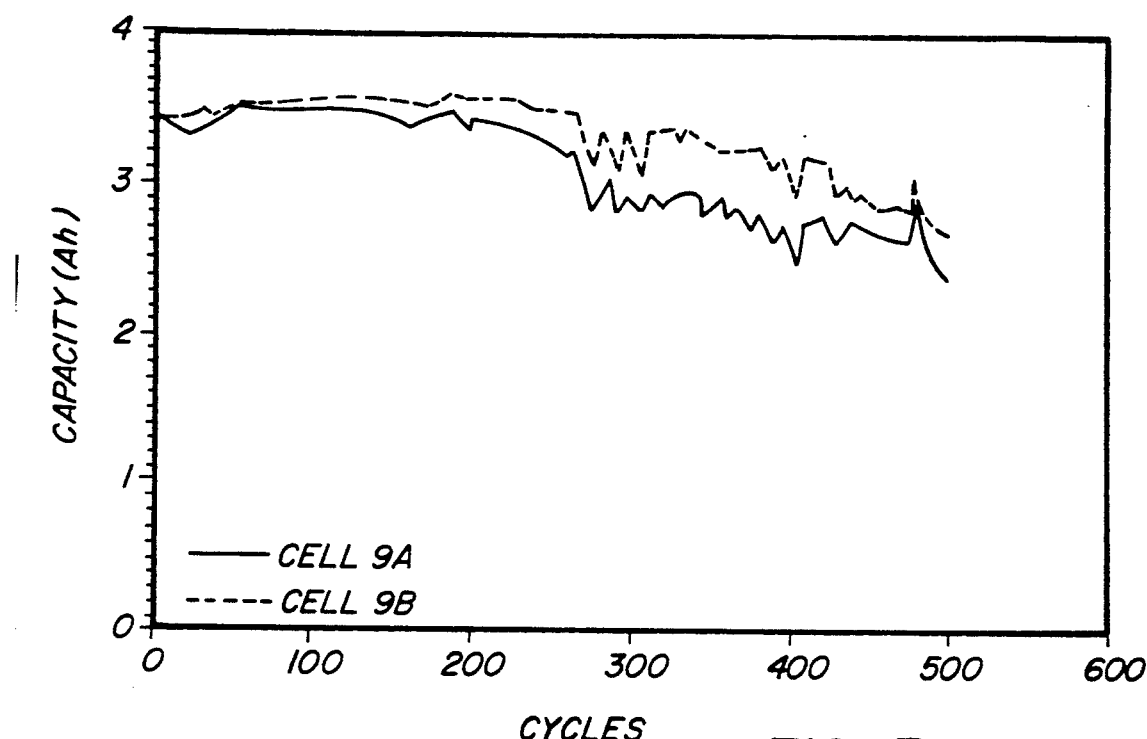
Figure 4:
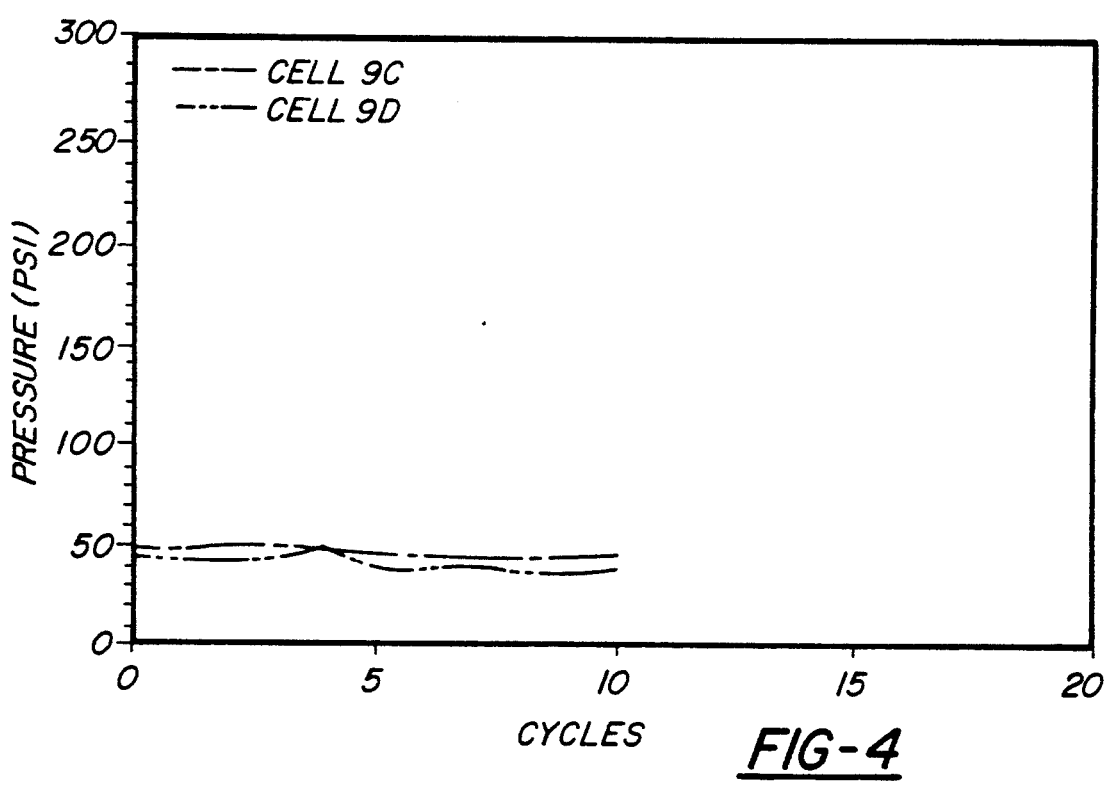

Cells 9A, 9B, 9C, 9D, and 9E were prepared as described above using alloy No. 9. These representative cells were subjected to charging and discharging conditions. The analysis of the resulting cells is presented in FIGS. 3 and 4. FIG. 3 shows peak capacities of about 3.7 Ah and cycle lives of about 500 cycles. FIG. 4 shows pressure remained steady during cycling.

In general, the comparison alloys have some good general performance characteristics combined with some poor performance characteristics. The result is alloys that lack the performance characteristics for them to be functional under all circumstances. This effectively limits their usefulness to particular special purpose applications. For example, Alloy #C2 has good rate capability, but poor charge retention, and moderate cycle life. Similarly, Alloy #C6 exhibits good energy density and charge retention, however it also requires a long activation, has a moderately high rate of discharge, and low temperature limitations.

In contrast, the alloys of the present invention have improved energy density, charge retention, and low temperature performance. The exemplified alloys demonstrate that the Base Alloys of the present invention are very close to a universal alloy that can be used in a wide variety of configurations for a wide variety of applications.

In view of the above, it is obvious to those skilled in the art that the present invention identifies and encompasses a range of alloy compositions which, when incorporated as a negative electrode in metal hydride cells results in batteries having improved performance characteristics.

The drawings, discussion, descriptions, and examples of this specification are merely illustrative of particular embodiments of the invention and are not meant as limitations upon its practice. It is the following claims, including all equivalents, that define the scope of the invention.

What is claimed is:

1. A disordered electrochemical hydrogen storage alloy comprising:

$$(Base\ Alloy)_a Co_b Mn_c Al_d Fe_e La_f Mo_g$$

where
said Base Alloy comprises 0.1 to 60 atomic percent Ti, 0.1 to 25 atomic percent Zr, 0.1 to 60 atomic percent V, 0.1 to 57 atomic percent Ni, and 0.1 to 56 atomic percent Cr;
b is 4 to 7 atomic percent;
c is 6 to 8 atomic percent;
d is 0.1 to 2 atomic percent;
e is 1 to 2 atomic percent;
f is 0.1 to 4 atomic percent; and
g is 0.1 to 6 atomic percent;
$b+c+d+e+f+g>0$; and
$a+b+c+d+e+f+g=100$ atomic percent.

2. The disordered electrochemical hydrogen storage alloy of claim 1, wherein said disordered electrochemical hydrogen storage alloy comprises a disordered microstructure where hydrogen in a particular phase is not easily discharged either through low surface area or through an oxide of limited porosity or catalytic property.

3. A disordered electrochemical hydrogen storage alloy comprising:

$$(Base\ Alloy)_a Co_b Mn_c Al_d Fe_e La_f$$

where
said Base Alloy comprises 0.1 to 60 atomic percent Ti, 0.1 to 25 atomic percent Zr, 0.1 to 60 atomic percent V, 0.1 to 57 atomic percent Ni, and 0.1 to 56 atomic percent Cr;
b is 0.1 to 7.5 atomic percent;
c is 0.1 to 8.5 atomic percent;
d is 0.1 to 2.5 atomic percent;
e is 0.1 to 3 atomic percent;
f is 0.1 to 4.5 atomic percent; and
$a+b+c+d+e+f=100$ atomic percent.

4. The disordered electrochemical hydrogen storage alloy of claim 3, wherein
b is 5 to 7 atomic percent;
c is 7 to 8 atomic percent;
d is 1.5 to 2.5 atomic percent;
e is 1 to 2 atomic percent;
f is 1 to 4 atomic percent.

5. The disordered electrochemical hydrogen storage alloy of claim 3, wherein said an alloy has the following composition:

$$V_{15}Ti_{15}Zr_{19}Ni_{28}Cr_4Co_4Fe_2Mn_7Al_2La_4.$$

6. The disordered electrochemical hydrogen storage alloy of claim 3, wherein said an alloy has the following composition:

$$V_{16}Ti_{16}Zr_{20}Ni_{28}Cr_4Co_4Fe_2Mn_7Al_2La_1.$$

7. An electrochemical hydrogen storage cell comprising:
a negative electrode composed of a disordered electrochemical alloy having the following composition:

$$(Base\ Alloy)_a Co_b Mn_c Al_d Fe_e La_f Mo_g$$

where
said Base Alloy comprises 0.1 to 60 atomic percent Ti, 0.1 to 25 atomic percent Zr, 0.1 to 60 atomic percent V, 0.1 to 57 atomic percent Ni, and 0.1 to 56 atomic percent Cr;
b is 4 to 7 atomic percent;
c is 6 to 8 atomic percent;
d is 0.1 to 2 atomic percent;
e is 1 to 2 atomic percent;
f is 0.1 to 4 atomic percent;
g is 0.1 to 6 atomic percent;
$b+c+d+e+f+g>0$; and
$a+b+c+d+e+f+g=100$ atomic percent;
a positive electrode; and
a separator.

8. The electrochemical hydrogen storage cell of claim 7, wherein said negative electrode further comprises:

a disordered microstructure where hydrogen in a particular phase is not easily discharged either through low surface area or through an oxide of limited porosity or catalytic property.

9. An electrochemical hydrogen storage cell comprising:

a negative electrode composed of a disordered electrochemical alloy having the following composition:

$$(\text{Base Alloy})_a Co_b Mn_c Al_d Fe_e La_f$$

where said Base Alloy comprises 0.1 to 60 atomic percent Ti, 0.1 to 25 atomic percent Zr, 0.1 to 60 atomic percent V, 0.1 to 57 atomic percent Ni, and 0.1 to 56 atomic percent Cr;

b is 0.1 to 7.5 atomic percent;
c is 0.1 to 8.5 atomic percent;
d is 0.1 to 2.5 atomic percent;
e is 0.1 to 3 atomic percent;
f is 0.1 to 4.5 atomic percent; and
$a+b+c+d+e+f=100$ atomic percent.

10. The electrochemical hydrogen storage cell of claim 9, wherein b is 5 to 7 atomic percent;
c is 7 to 8 atomic percent;
d is 1.5 to 2.5 atomic percent;
e is 1 to 2 atomic percent; and
f is 1 to 4 atomic percent.

11. The electrochemical hydrogen storage cell of claim 9, wherein said an alloy has the following composition:

$$V_{15}Ti_{15}Zr_{19}Ni_{28}Cr_4Co_4Fe_2Mn_7Al_2La_4.$$

12. The electrochemical hydrogen storage cell of claim 9, wherein said an alloy has the following composition:

$$V_{16}Ti_{16}Zr_{20}Ni_{28}Cr_4Co_4Fe_2Mn_7Al_2La_1.$$

13. The electrochemical hydrogen storage cell claimed in claim 7, wherein said alloy is subjected to an alkaline etch while in powder form.

* * * * *